(12) United States Patent
Woodard

(10) Patent No.: US 12,197,698 B1
(45) Date of Patent: Jan. 14, 2025

(54) DIGITAL RESTAURANT MENU WITH TOUCH SCREEN

(71) Applicant: Daya Woodard, Asheboro, NC (US)

(72) Inventor: Daya Woodard, Asheboro, NC (US)

( * ) Notice: Subject to any disclaimer, the term of this patent is extended or adjusted under 35 U.S.C. 154(b) by 0 days.

(21) Appl. No.: 17/550,027

(22) Filed: Dec. 14, 2021

(51) Int. Cl.
| | |
|---|---|
| *G06F 3/0482* | (2013.01) |
| *G06F 3/023* | (2006.01) |
| *G06F 3/041* | (2006.01) |
| *G06F 3/0488* | (2022.01) |
| *G06F 3/147* | (2006.01) |
| *G06F 3/16* | (2006.01) |
| *G06Q 30/0601* | (2023.01) |
| *G06Q 50/12* | (2012.01) |
| *G09B 21/00* | (2006.01) |

(52) U.S. Cl.
CPC ............ *G06F 3/0482* (2013.01); *G06F 3/023* (2013.01); *G06F 3/041* (2013.01); *G06F 3/0488* (2013.01); *G06F 3/147* (2013.01); *G06F 3/165* (2013.01); *G06F 3/167* (2013.01); *G06Q 30/0641* (2013.01); *G06Q 50/12* (2013.01); *G09B 21/004* (2013.01); *G09B 21/007* (2013.01)

(58) Field of Classification Search
CPC ........ G06F 3/0482; G06F 3/023; G06F 3/041; G06F 3/0488; G06F 3/147; G06F 3/165; G06F 3/167; G06Q 30/0641; G06Q 50/12; G09B 21/004; G09B 21/007
See application file for complete search history.

(56) References Cited

U.S. PATENT DOCUMENTS

| | | |
|---|---|---|
| 6,914,582 B2 | 7/2005 | Tanaka |
| D633,491 S | 3/2011 | Noel |
| 7,930,212 B2 * | 4/2011 | Perry ................ G06F 1/1688 704/271 |
| 8,756,106 B2 | 6/2014 | Baril |
| 10,769,207 B2 * | 9/2020 | An .................... G06F 16/434 |
| 2002/0133418 A1 | 9/2002 | Hammond |
| 2005/0015301 A1 | 1/2005 | Johnson |
| 2005/0171850 A1 | 8/2005 | Yueh |
| 2005/0261974 A1 | 11/2005 | Podratz |
| 2008/0243624 A1 * | 10/2008 | Perry ................. G06Q 50/12 705/15 |
| 2008/0270244 A1 | 10/2008 | Arasteh |

(Continued)

FOREIGN PATENT DOCUMENTS

WO      2005010696      10/2007

*Primary Examiner* — Vijay Shankar
(74) *Attorney, Agent, or Firm* — Kyle A. Fletcher, Esq.

(57) ABSTRACT

The digital restaurant menu with touch screen comprises an electronic tablet, a plurality of operator controls, one or more wireless communication circuits, one or more speakers, and a microphone. The electronic tablet may be adapted for use in a restaurant and may present one or more menus to a user via a display screen and/or audibly via the one or more speakers. The electronic tablet may be adapted for use by a visually-impaired user. The one or more menus may be navigated using the plurality of operator controls, a touch sensitive overlay, voice commands spoken into the microphone, or combinations thereof. The plurality of operator controls may comprise braille relief. The electronic tablet may be operable to communicate with one or more external devices via the one or more wireless communication circuits.

18 Claims, 4 Drawing Sheets

(56) References Cited

U.S. PATENT DOCUMENTS

2011/0227853 A1* 9/2011 Warungu ........... G06Q 30/0603
                                                                 345/173
2014/0067562 A1   3/2014 Gravesande
2017/0222868 A1* 8/2017 Tan .................... G06Q 30/0633
2019/0057150 A1* 2/2019 An ...................... G06F 3/04812

* cited by examiner

DIGITAL RESTAURANT MENU WITH TOUCH SCREEN

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the fields of restaurant equipment and order entry systems, more specifically, a digital restaurant menu with touch screen.

SUMMARY OF INVENTION

The digital restaurant menu with touch screen comprises an electronic tablet, a plurality of operator controls, one or more wireless communication circuits, one or more speakers, and a microphone. The electronic tablet may be adapted for use in a restaurant and may present one or more menus to a user via a display screen and/or audibly via the one or more speakers. The electronic tablet may be adapted for use by a visually-impaired user. The one or more menus may be navigated using the plurality of operator controls, a touch sensitive overlay, voice commands spoken into the microphone, or combinations thereof. The plurality of operator controls may comprise braille relief. The electronic tablet may be operable to communicate with one or more external devices via the one or more wireless communication circuits. As non-limiting examples, the one or more external devices may be wireless headphones or a remote server via a wireless computer network.

An object of the invention is to display and navigate a restaurant menu using an electronic tablet.

Another object of the invention is to provide a display screen, audio output via one or more speakers and an audio port, a plurality of operator controls, a touch sensitive overlay on the display, and voice command recognition via a microphone for interfacing with a user.

A further object of the invention is to provide one or more wireless communication circuits for communicating with one or more external devices.

Yet another object of the invention is to enable the electronic tablet for use by a visually-impaired user by providing braille relief on the operator controls, audio output of items displayed on the display screen, and voice command recognition.

These together with additional objects, features and advantages of the digital restaurant menu with touch screen will be readily apparent to those of ordinary skill in the art upon reading the following detailed description of the presently preferred, but nonetheless illustrative, embodiments when taken in conjunction with the accompanying drawings.

In this respect, before explaining the current embodiments of the digital restaurant menu with touch screen in detail, it is to be understood that the digital restaurant menu with touch screen is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the digital restaurant menu with touch screen.

It is therefore important that the claims be regarded as including such equivalent construction insofar as they do not depart from the spirit and scope of the digital restaurant menu with touch screen. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
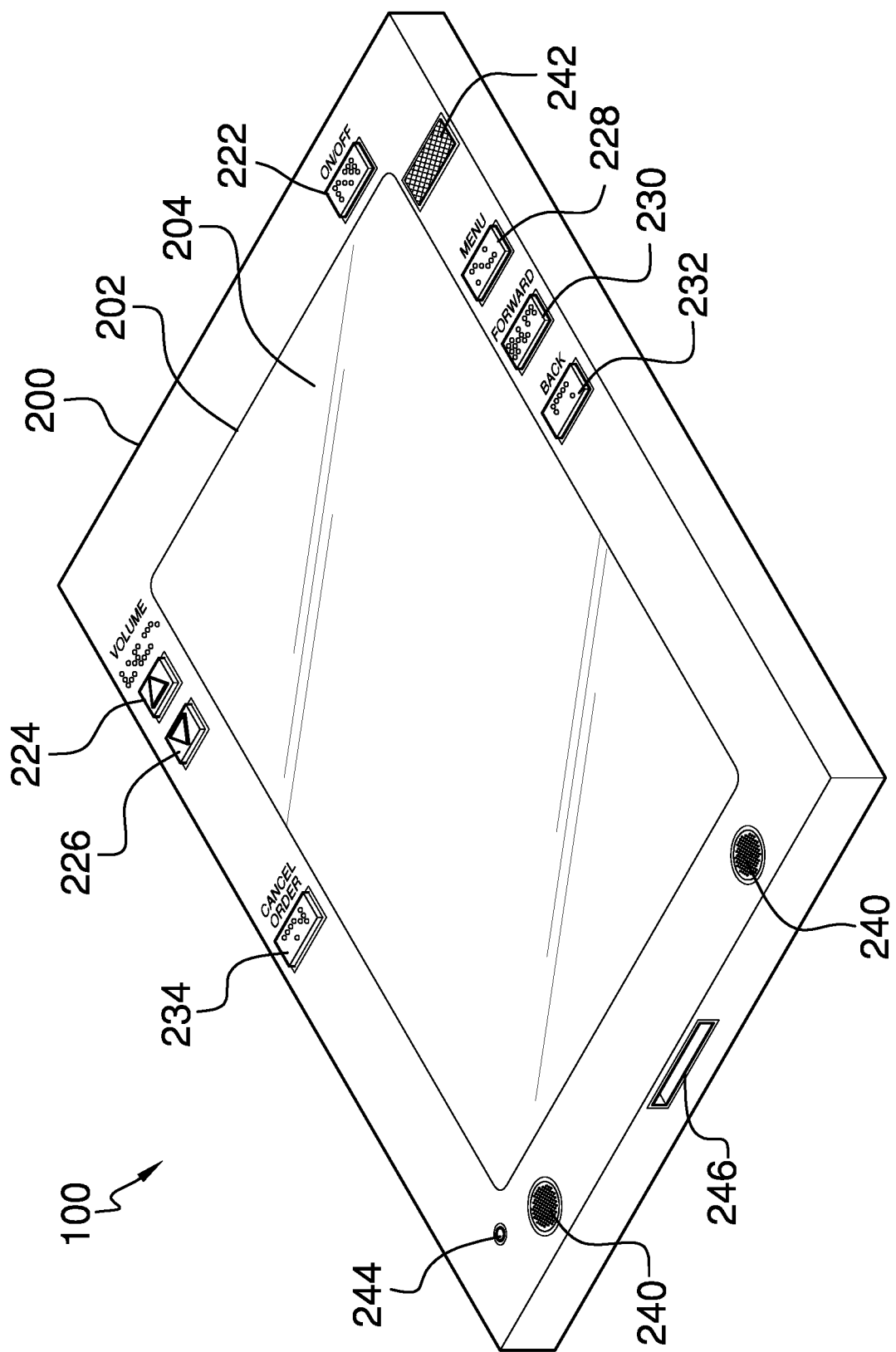
FIG. 1 is an isometric view of an embodiment of the disclosure.
Figure 2:
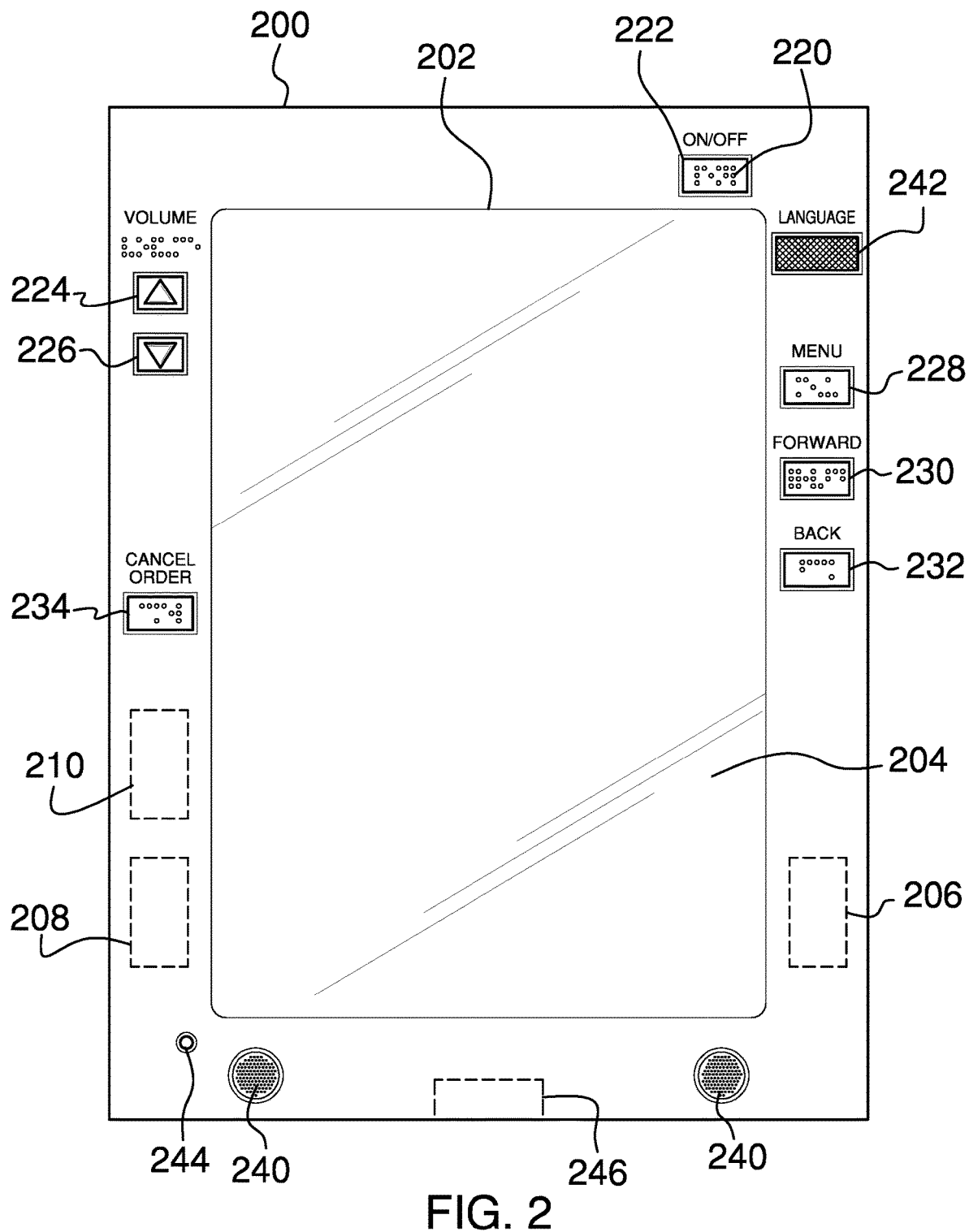
FIG. 2 is a front view of an embodiment of the disclosure.
Figure 3:
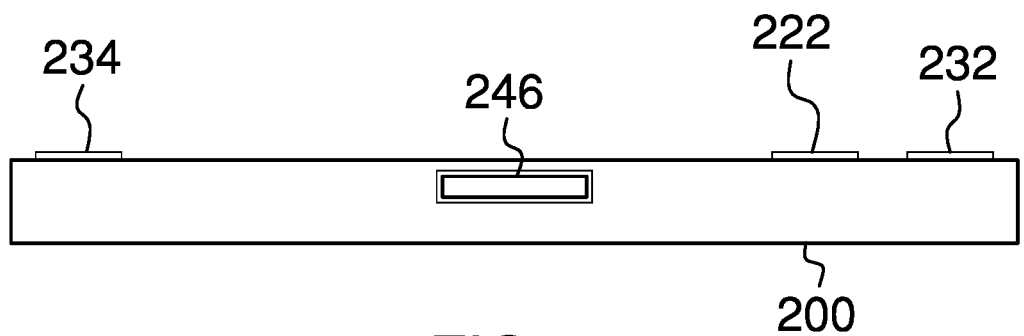
FIG. 3 is a bottom view of an embodiment of the disclosure.
Figure 4:
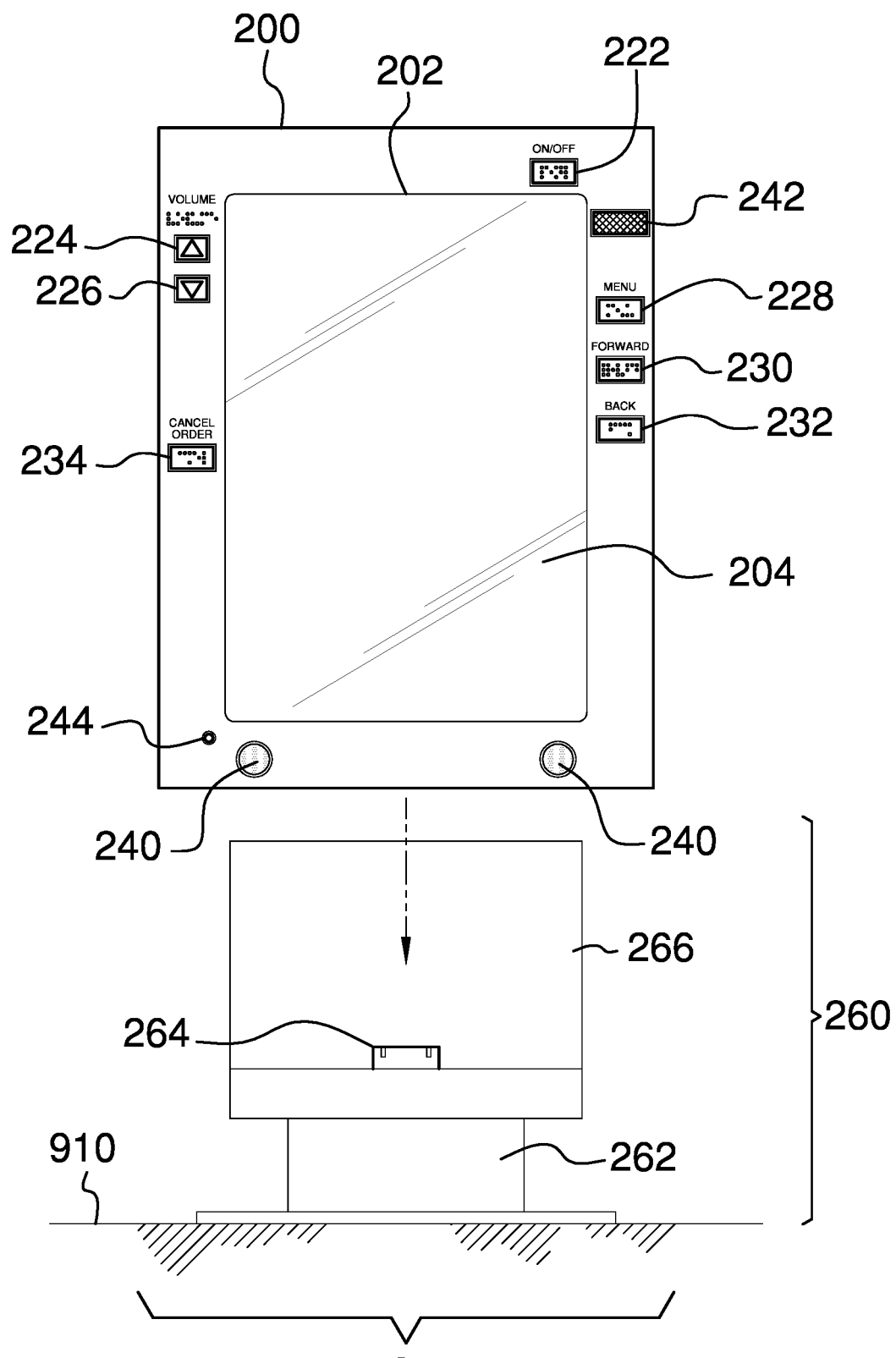
FIG. 4 is a detail view of an embodiment of the disclosure illustrating the electronic tablet mating with the mount.

Detailed reference will now be made to a first potential embodiment of the disclosure, which is illustrated in FIGS. 1 through 4.

The digital restaurant menu with touch screen 100 (hereinafter invention) comprises an electronic tablet 200, a plurality of operator controls, one or more wireless communication circuits 210, one or more speakers 240, and a microphone 242. The electronic tablet 200 may be adapted for use in a restaurant and may present one or more menus to a user via a display screen 202 and/or audibly via the one or more speakers 240. The electronic tablet 200 may be adapted for use by a visually-impaired user. The one or more menus may be navigated using the plurality of operator controls, a touch sensitive overlay 204, voice commands spoken into the microphone 242, or combinations thereof. The plurality of operator controls may comprise braille relief 220. The electronic tablet 200 may be operable to communicate with one or more external devices via the one or more wireless communication circuits 210. As non-limiting examples, the one or more external devices may be wireless headphones or a remote server via a wireless computer network.

The electronic tablet 200 may be an intelligent device comprising the display screen 202, an audio output circuit 206, an audio input circuit 208, and the one or more wireless communication circuits 210. The electronic tablet 200 may be adapted to present the one or more menus to the user and may be operable to accept input from the user to navigate through the one or more menus.

As a non-limiting example, the one or more menus may present food and/or beverages available within the restaurant. Navigation may involve selecting an 'entrée' menu, a 'sides' menu, a 'dessert' menu, or a 'beverage' menu from a main menu and updating the display screen 202 to show the selected menu. In some embodiments, the electronic tablet 200 may be operable to accept food and/or beverage selections from the one or more such that meals may be ordered for one or more individuals.

The electronic tablet 200 may comprise a processor and a memory. The memory may contain instructions for causing the processor to update the display screen 202, accept input from the touch sensitive overlay 204 and from the plurality of operator controls, and communicate via the one or more wireless communication circuits 210.

The display screen 202 may be a flat viewing screen that presents text and/or images as pixels. The determination of which pixels to activate may be made by a program executing on the electronic tablet 200. The pixels may be arranged in a matrix comprising addressable rows and columns. Moving images, if used, may be displayed by presenting a series of still images at a frame rate of 18 images per second or greater. The display screen 202 may be LCD technology, LED technology, OLED technology, plasma technology, electronic paper, or other flat-panel display technologies. The display screen 202 may comprise a backlight that allows the image to be seen in the dark. The display screen 202 may be coupled to the front of the electronic tablet 200.

The touch sensitive overlay 204 may be a touch-sensitive interface. The touch sensitive overlay 204 may be located in front of the display screen 202 and may be transparent such that the touch sensitive overlay 204 does not block visibility of the display screen 202. The touch sensitive overlay 204 may be adapted to register touches and to report such touches to the electronic tablet 200. The touch sensitive overlay 204 and the display screen 202 may be aligned such that touches reported by the touch sensitive overlay 204 correspond to touch targets shown on the display screen 202. As non-limiting examples, the touch sensitive overlay 204 may utilize capacitive technology, resistive technology, surface acoustic wave technology, infrared technology, dispersive signal technology, or other touch screen technology. Touches reported by the touch sensitive overlay 204 may be operable to change the one or more menus that are displayed. In some embodiments, the touch sensitive overlay 204 may be operable to present touch targets that correspond to each of the plurality of operator controls.

The audio output circuit 206 may produce an audio output signal that may be routed to the one or more speakers 240 to produce audio. The electronic tablet 200 may be adapted to produce audio via the audio output circuit 206 describing the contents of the display screen 202, touches made to the touch sensitive overlay 204, activation of the plurality of operator controls, or combination thereof. In some embodiments, the activation of the audio output circuit 206 may utilize text-to-speech technology. Audio played through the one or more speakers 240 may enable the visually-impaired user to operate the electronic tablet 200 by providing audible feedback during usage.

The audio input circuit 208 may be electrically coupled to the microphone 242. The audio input circuit 208 may convert audio input received at the microphone 242 into electronic messages within the electronic tablet 200. The electronic messages may be interpreted by the electronic tablet 200 and may result in an action of the electronic tablet 200 equivalent to having touched the touch sensitive overlay 204 or activated the plurality of operator controls. In some embodiments, the conversion of spoken commands to electronic messages by the audio input circuit 208 may utilize speech-to-text technology. Audio input via the microphone 242 may enable the visually-impaired user to operate the electronic tablet 200 by speaking commands.

The plurality of operator controls may be adapted for the user to control the electronic tablet 200 and to direct the navigation through the one or more menus. The braille relief 220 on each of the plurality of operator controls may be adapted to enable the visually-impaired user to operate the electronic tablet 200 using the plurality of operator controls. In a preferred embodiment, the plurality of operator controls may be located on the front of the electronic tablet 200 and adjacent to the display screen 202.

The plurality of operator controls may comprise an ON/OFF control 222. The ON/OFF control 222 may activate the electronic tablet 200 if the electronic tablet 200 is deactivated and may deactivate the electronic tablet 200 is the electronic tablet 200 is activated. The plurality of operator controls may comprise a VOLUME UP control 224 and a VOLUME DOWN control 226. The VOLUME UP control 224 may increase the volume of audio played through the one or more speakers 240 and the VOLUME DOWN control 226 may decrease the volume of audio played through the one or more speakers 240. The plurality of operator controls may comprise a MENU control 228. The MENU control 228 may initiate the display of the next menu in a sequence of the one or more menus. The plurality of operator controls may comprise a FORWARD control 230 and a BACK control 232. The FORWARD control 230 and the BACK control 232 may be operable to navigate to a different menu or to navigate within a menu. The plurality of operator controls may comprise a CANCEL control 234. The CANCEL control 234 may be operable to cancel an order by erasing all food and/or beverage selections.

In some embodiments, activating a combination of the plurality of operator controls at the same time may activate an administrator mode. Administrator mode may show one or more administrator menus that are oriented towards configuring the electronic tablet 200, configuring wireless communications channels, displaying statistics collected during usage, or combinations thereof.

In some embodiments, the plurality of operator controls may comprise additional controls to facilitate order entry. As a non-limiting example, some embodiments of the plurality of operator controls may comprise an ENTER control to affirm a selection, an UP and a DOWN control to navigate to a specific entry on a menu, a HELP control to request assistance from wait staff, or combinations thereof.

The one or more wireless communication circuits 210 may be operable to pass electronic messages between the electronic tablet 200 and the one or more external devices. As non-limiting examples, the one or more external devices may be the wireless headphones through which the audio output of the one or more speakers 240 may be played or the remote server via the wireless computer network through which software programs within the electronic tablet 200 may be updated. As a further non-limiting example, the electronic tablet 200 may be adapted to communicate menu selections made by the user to a kitchen via the one or more wireless communication circuits 210. As non-limiting examples, the one or more wireless communication circuits 210 may implement WiFi, WiFi Direct, Bluetooth, NFC, BLE, Zigbee, Z-Wave, 6LoWPAN, or combinations thereof.

In some embodiments, the electronic tablet 200 may comprise an audio port 244 for plugging a pair of wired headphone.

The electronic tablet 200 may comprise a mounting port 246. The mounting port 246 may accept a mounting coupler 264 of a mount 260 so that the electronic tablet 200 may be installed on the mount 260 at a table 910 or on a wall in the restaurant. The mount 260 may provide mechanical support for the electronic tablet 200, power connections for the electronic tablet 200, communications connections for the electronic tablet 200, or combinations thereof.

The mount 260 may couple to the table 910 or the wall via a pedestal 262. The mount 260 may comprise the mounting coupler 264 for mating to the electronic tablet 200. In some embodiments, the mount 260 may comprise a backing support 266 which may mechanically support the back of the electronic tablet 200 when the electronic tablet 200 is coupled to the mount 260.

The electronic tablet 200 may support two or more languages. Supporting the two or more languages may refer to marking the plurality of operator controls in a multi-lingual manner, displaying content on the display screen 202 in a multi-lingual manner, recognizing phrases and words spoken into the microphone 242 when spoken in one of the two or more languages, playing output audio through the one or more speakers 240 and/or the audio port 244 in a multi-lingual manner, or combinations thereof. In some embodiments, the electronic tablet 200 may support the two or more languages simultaneously. In some embodiments, the electronic tablet 200 may support one language selected from the two or more languages via a language menu.

In use, the mount 260 may be attached to a table 910 or a wall in the restaurant and the electronic tablet 200 may be coupled to the mount 260 by sliding the mounting port 246 over the mounting coupler 264 on the mount 260. The user may view the one or more menus on the display screen 202 and may navigate between the one or more menus using the plurality of operator controls and/or the touch sensitive overlay 204. A visually-impaired user may operate the electronic tablet 200 by listening to the one or more menus and other messages played via the one or more speakers 240 as audio and by sensing the braille relief 220 on the plurality of operator controls. Additionally, the user may speak commands to the microphone 242 to operate the electronic tablet 200 and to navigate the one or more menus.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" may refer to top and "lower" may refer to the bottom. As a non-limiting example, the upper end of a vertical shaft is the top end of the vertical shaft.

As used in this disclosure, "Bluetooth" may refer to a standardized communication protocol that is used to wirelessly interconnect electronic devices. Bluetooth® is a registered trademark of Bluetooth SIG.

As used herein, the words "control" or "controls" are intended to include any device which can cause the completion or interruption of an electrical circuit; non-limiting examples of controls include toggle switches, rocker switches, push button switches, rotary switches, electromechanical relays, solid state relays, touch sensitive interfaces and combinations thereof whether they are normally open, normally closed, momentary contact, latching contact, single pole, multi-pole, single throw, or multi-throw. In some embodiments, a control may alter an electrical property of a circuit such as resistance, inductance, or capacitance.

As used in this disclosure, the word "correspond" may indicate that a first object is in some manner linked to a second object in a one to one relationship or that one or more properties shared by two or more objects match, agree, or align within acceptable manufacturing tolerances.

As used herein, the words "couple", "couples", "coupled" or "coupling", may refer to connecting, either directly or indirectly, and does not necessarily imply a mechanical connection.

As used in this disclosure, a "display" may be a surface upon which is presented an image, potentially including, but not limited to, graphic images and text, that is interpretable by an individual viewing the image. When used as a verb, "display" may be defined as presenting such an image.

As used herein, "e-paper" or "electronic paper" may refer to an electronic display technology that mimics the appearance of ordinary ink on paper. As a non-limiting example, e-paper may reflect ambient light from a plurality of microscopic elements that may be driven by static charges into one of two states—one state that substantially reflects ambient light and one state that substantial absorbs reflected light. A common trait of e-paper displays may be that an image written to the display may remain readable even with power removed from the display.

As used herein, "front" may indicate the side of an object that is closest to a forward direction of travel under normal use of the object or the side or part of an object that normally presents itself to view or that is normally used first. "Rear" or "back" may refer to the side that is opposite the front.

As used in this disclosure, "LCD" may be an acronym for Liquid Crystal Display. A liquid crystal display comprises a liquid crystal film placed between two sheets of transparent material. The visual characteristics of the LCD can be varied through the application of a voltage.

As used in this disclosure, an "LED" may be an acronym for a light emitting diode. An LED allows current to flow in one direction and when current is flowing the LED emits photons. The wavelength of the light that is emitted may be in the visible range of the spectrum or may extend into either the infrared (IR) spectral range or the ultraviolet (UV) spectral range. The brightness of the LED can be increased and decreased by controlling the amount of current flowing through the LED. Multiple LEDs having different emission spectrums may be packaged into a single device to produce a multi-color LED. A broad range of colors may be produced by multi-color LEDs by selecting which of the multiple LEDs are energized and by controlling the brightness of each of the multiple LEDs. Organic LEDs (OLEDs) are included in this definition.

As used in this disclosure, a "microphone" may be a transducer that converts the energy from vibration into electrical energy. The sources of vibrations include, but are not limited to, acoustic energy.

As used in this disclosure, "near field communication" commonly called NFC, may refer to an RFID technology and communication protocol that is commonly implemented on personal data devices.

As used in this disclosure, a "port" may be an electrical termination that is used to connect a first electrical circuit to a second external electrical circuit.

As used herein, the words "printed", "marked", and "marking" may refer to a mark that has been made on an object. The process of making the mark may involve printing, lithography, thermal transfer, painting, embossing, molding, burning, silk-screening, drawing, etching, engraving, stenciling, stamping, spraying of pigments, or other processes which result in the controlled change of coloration and/or shape of a surface.

As used herein, the terms "processor", "central processor", "central processing unit", "CPU", or "microprocessor" may refer to a digital device that carries out the instructions comprising a computer program by performing basic arithmetic, logical, control, and input/out operations. The term "microprocessor" may additionally imply a level of miniaturization and power reduction that makes the device suitable for portable or battery operated systems.

As used herein, "restaurant" may refer to a business where food and/or beverages may be purchased, whether the food and/or beverages are consumed at the restaurant or elsewhere. The term "restaurant" is intended to be inclusive of all establishments that sell food and/or beverages regardless of the size of the establishment, size of the menu selection, type of food/and or beverages sold, and whether the restaurant occupies a permanent location, transient location, or is mobile. Non-limiting examples of restaurants comprise fine-dining restaurants, casual-dining restaurants, family restaurants, fast-food restaurants, diners, beaneries, cafes, grills, carts, stands, food trucks, buffet restaurants, eateries, coffee shops, and pubs.

As used herein, "smart device" may refer to a portable electrical device comprising at least a processor, display, input device, and network connection. The input device is generally a touch screen, keyboard, or voice recognition. The network connection is generally wireless. Non-limiting examples of smart devices may include smartphones, tablets, personal digital assistants, laptop computers, and smartwatches. Smart devices may also be referred to as intelligent devices.

As used in this disclosure, a "touchscreen" may be an interface that allows a user to interface with a logical device by touching the image bearing surface of a display.

As used in this disclosure, "WiFi" may refer to the physical implementation of a collection of wireless electronic communication standards commonly referred to as IEEE 802.11x and used for wireless communication between devices.

As used in this disclosure, "wireless" may be an adjective that is used to describe a communication channel that does not require the use of physical cabling.

With respect to the above description, it is to be realized that the optimum dimensional relationship for the various components of the invention described above and in FIGS. 1 through 4, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A digital restaurant menu with touch screen comprising:
    an electronic tablet, a plurality of operator controls, one or more wireless communication circuits, one or more speakers, and a microphone;
    wherein the electronic tablet is adapted for use in a restaurant and presents one or more menus to a user via a display screen and/or audibly via the one or more speakers;
    wherein the electronic tablet is adapted for use by a visually-impaired user;
    wherein the one or more menus are navigated using the plurality of operator controls, a touch sensitive overlay, voice commands spoken into the microphone, or combinations thereof;
    wherein the plurality of operator controls comprise braille relief;
    wherein the electronic tablet is operable to communicate with one or more external devices via the one or more wireless communication circuits;
    wherein the plurality of operator controls comprise an ON/OFF control;
    wherein the ON/OFF control activates the electronic tablet if the electronic tablet is deactivated and deactivates the electronic tablet is the electronic tablet is activated;
    wherein the plurality of operator controls comprise a VOLUME UP control and a VOLUME DOWN control;
    wherein the VOLUME UP control increases the volume of audio played through the one or more speakers and the VOLUME DOWN control decreases the volume of audio played through the one or more speakers;
    wherein the plurality of operator controls comprise a MENU control;
    wherein the MENU control initiates the display of the next menu in a sequence of the one or more menus;
    wherein the plurality of operator controls comprise a FORWARD control and a BACK control;
    wherein the FORWARD control and the BACK control are operable to navigate to a different menu or to navigate within a menu;
    wherein the plurality of operator controls comprise a CANCEL control;
    wherein the CANCEL control is operable to cancel an order by erasing all food and/or beverage selections.

2. The digital restaurant menu with touch screen according to claim 1
    wherein the electronic tablet is an intelligent device comprising the display screen, an audio output circuit, an audio input circuit, and the one or more wireless communication circuits;

wherein the electronic tablet is adapted to present the one or more menus to the user and is operable to accept input from the user to navigate through the one or more menus.

3. The digital restaurant menu with touch screen according to claim 2
wherein the display screen is a flat viewing screen that presents text and/or images as pixels;
wherein the determination of which pixels to activate is made by a program executing on the electronic tablet;
wherein the pixels are arranged in a matrix comprising addressable rows and columns;
wherein the display screen comprises a backlight that allows the image to be seen in the dark;
wherein the display screen is coupled to the front of the electronic tablet.

4. The digital restaurant menu with touch screen according to claim 3
wherein the touch sensitive overlay is a touch-sensitive interface;
wherein the touch sensitive overlay is located in front of the display screen and is transparent such that the touch sensitive overlay does not block visibility of the display screen;
wherein the touch sensitive overlay is adapted to register touches and to report such touches to the electronic tablet;
wherein the touch sensitive overlay and the display screen are aligned such that touches reported by the touch sensitive overlay correspond to touch targets shown on the display screen.

5. The digital restaurant menu with touch screen according to claim 4
wherein the audio output circuit produces an audio output signal that is routed to the one or more speakers to produce audio;
wherein the electronic tablet is adapted to produce audio, via the audio output circuit, describing the contents of the display screen, touches made to the touch sensitive overlay, activation of the plurality of operator controls, or combination thereof.

6. The digital restaurant menu with touch screen according to claim 5
wherein the audio input circuit is electrically coupled to the microphone;
wherein the audio input circuit converts audio input received at the microphone into electronic messages within the electronic tablet;
wherein the electronic messages are interpreted by the electronic tablet and result in an action of the electronic tablet equivalent to having touched the touch sensitive overlay or activated the plurality of operator controls.

7. The digital restaurant menu with touch screen according to claim 6
wherein the plurality of operator controls are adapted for the user to control the electronic tablet and to direct the navigation through the one or more menus.

8. The digital restaurant menu with touch screen according to claim 7
wherein the plurality of operator controls are located on the front of the electronic tablet and adjacent to the display screen.

9. The digital restaurant menu with touch screen according to claim 7
wherein the one or more wireless communication circuits are operable to pass electronic messages between the electronic tablet and the one or more external devices.

10. The digital restaurant menu with touch screen according to claim 9
wherein the one or more external devices are wireless headphones through which the audio output of the one or more speakers are played or a remote server from which software programs within the electronic tablet are updated.

11. The digital restaurant menu with touch screen according to claim 9
wherein the electronic tablet is adapted to communicate menu selections made by the user to a kitchen via the one or more wireless communication circuits.

12. The digital restaurant menu with touch screen according to claim 11
wherein the electronic tablet comprises an audio port for plugging a pair of wired headphone.

13. The digital restaurant menu with touch screen according to claim 12
wherein the electronic tablet comprises a mounting port;
wherein the mounting port accepts a mounting coupler of a mount so that the electronic tablet installs on the mount at a table or on a wall in the restaurant;
wherein the mount provides mechanical support for the electronic tablet, power connections for the electronic tablet, communications connections for the electronic tablet, or combinations thereof.

14. The digital restaurant menu with touch screen according to claim 13
wherein the mount couples to the table or the wall via a pedestal;
wherein the mount comprises the mounting coupler for mating to the electronic tablet.

15. The digital restaurant menu with touch screen according to claim 14
wherein the mount comprises a backing support which mechanically supports the back of the electronic tablet when the electronic tablet is coupled to the mount.

16. The digital restaurant menu with touch screen according to claim 14
wherein the electronic tablet supports two or more languages.

17. The digital restaurant menu with touch screen according to claim 16
wherein the electronic tablet supports the two or more languages simultaneously.

18. The digital restaurant menu with touch screen according to claim 16 wherein the electronic tablet supports one language selected from the two or more languages via a language menu.

* * * * *